Figure 1:
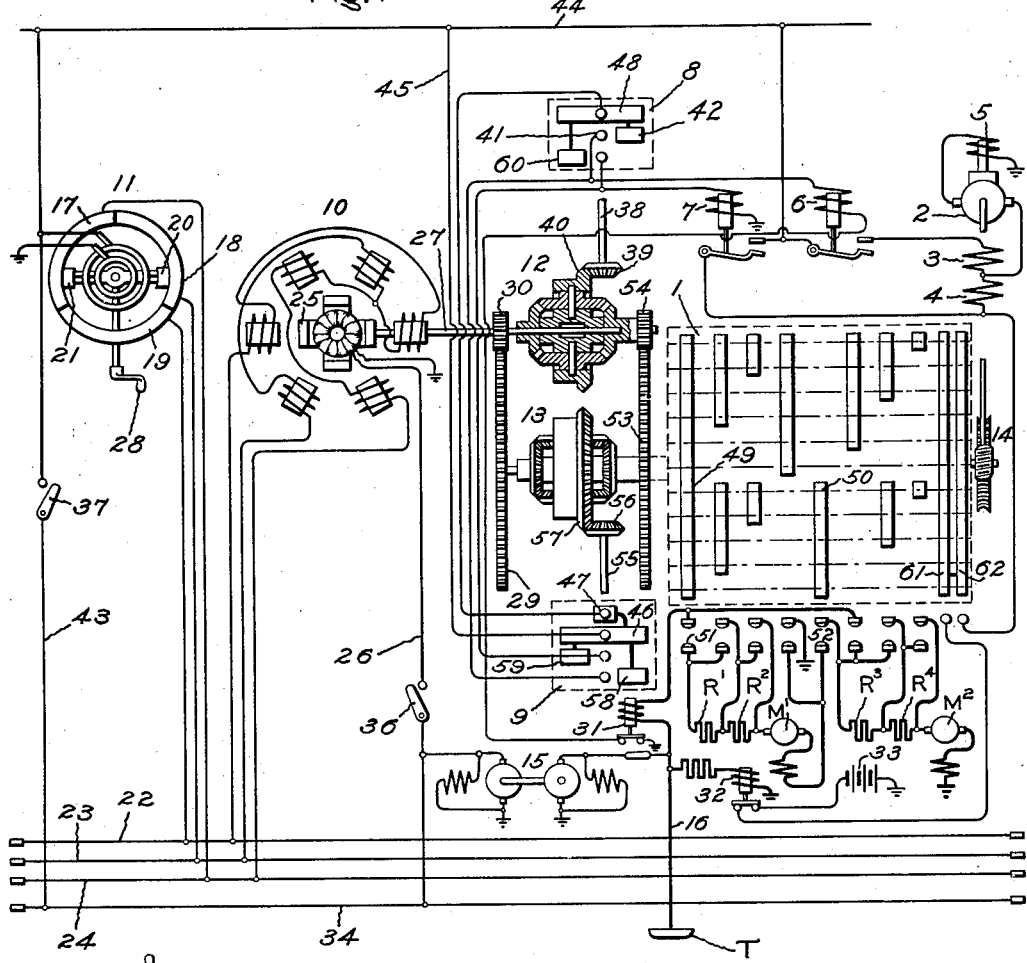

W. S. H. HAMILTON.
MOTOR CONTROL.
APPLICATION FILED JULY 6, 1917.

1,267,216.

Patented May 21, 1918.

Inventor:
William S. H. Hamilton,
by Albert G. Davis
His Attorney.

UNITED STATES PATENT OFFICE.

WILLIAM S. H. HAMILTON, OF SCHENECTADY, NEW YORK, ASSIGNOR TO GENERAL ELECTRIC COMPANY, A CORPORATION OF NEW YORK.

MOTOR CONTROL.

1,267,216.  Specification of Letters Patent.  Patented May 21, 1918.

Application filed July 6, 1917. Serial No. 179,046.

*To all whom it may concern:*

Be it known that I, WILLIAM S. H. HAMILTON, a citizen of the United States, residing at Schenectady, in the county of Schenectady, State of New York, have invented certain new and useful Improvements in Motor Controls, of which the following is a specification.

My invention relates to the control of electric motors and it provides improved means whereby the motors may be started and stopped and generally controlled in a safe, reliable and efficient manner.

More specifically my invention relates to the control of the driving motors of train units, particularly to the control of a plurality of train units, each having driving motors arranged to be grouped in various relations, with provision for controlling all of the motors simultaneously from a single unit. Such control is usually termed "multiple unit" control. My invention relates more particularly to multiple unit control of the pilot motor type in which a main motor controller for the driving motors on each train unit is operated by a pilot motor and the pilot motors of all the units, and thus the units themselves, are controlled from a single master controller on one of the units, and my invention has for one of its objects the improvement of such control so as to obtain a positive and effective control of the driving motors and give a large number of control steps by means of a simple arrangement necessitating few control and train wires.

In carrying my invention into effect, I provide a main controller on each car for making the various changes in the driving motor circuits and operate this controller by means of a pilot motor. To govern the operation of the pilot motor I provide a synchronous motor and a switching mechanism operated responsively to the relative movement of the pilot motor and the synchronous motor by means such as a differential gear mechanism, one end of the differential being connected to the shaft of the synchronous motor and the other end to the main controller. I provide a small master controller for controlling the synchronous motor to cause it to advance or reverse by reason of the alternating current produced by the movement of the master controller, the arrangement being such that turning the master switch to a desired position will practically simultaneously cause the synchronous motor to assume a corresponding position, and thus through the differential gear mechanism operate the switching mechanism so as to energize the pilot motor to move the main controller to the position determined by the setting of the master controller, independently of the rate of movement of the master controller. When the pilot motor has moved the main controller to the position corresponding to the position of the master controller, it is deënergized through the medium of the differential gear mechanism. A time interval is thus introduced so that the changes in the main motor circuits will not ordinarily be made faster than that desired for smooth acceleration. By means of a small number of train wires connecting the train units so as to operate the synchronous motors on all the train units synchronously with the movement of the master controller, all of these train units can be controlled from a single point.

With my arrangement which is simple in construction and positive in action, a very precise control of the pilot motors is effected so that the main controllers can be accurately moved a small or large amount as desired, thus giving a large number of possible control steps and a control in which the main motors are always accelerated smoothly and at the same rate, no matter how fast the master controller is moved. Furthermore, my arrangement necessitates comparatively small wires to control the synchronous motors since the current taken by these motors is very small, and by reason of that fact, the master controller or controllers, the train wires and the couplers can be made quite small and inexpensive.

For a better understanding of my invention, reference is had to the following description taken in connection with the accompanying drawing wherein I have shown diagrammatically one embodiment of my invention.

Figure 2:
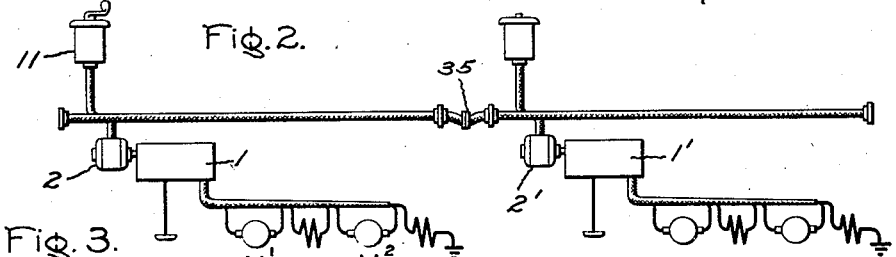
Figure 3:
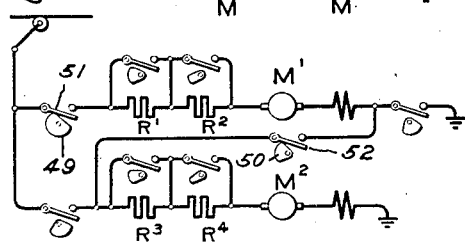

Referring to the drawing, Figure 1 shows in simplified diagram a system of motor control for a single unit; Fig. 2 shows in simplified diagram the arrangement for connecting the train units together so that these units can be controlled from a single point; Fig. 3 shows a simplified diagram of the driving motor circuit connections which are made by the operation of the cams on the pilot motor operated main motor controller.

Referring to Fig. 1, the driving motors M¹ and M² for the single train unit are started and stopped and generally controlled by means of the main motor controller 1 which is operated by means of the pilot motor 2. The main motor controller 1 is preferably of the well known form of a cylinder having on its outer surface a plurality of cams which are adapted to directly operate switches for making the various changes in the driving motor circuits. The pilot motor is provided with two oppositely wound field windings 3 and 4 for the purpose of operating the pilot motor in the forward or reverse direction so as to control the direction of operation of the main motor controller 1. A solenoid brake 5 is provided for the pilot motor and is so arranged that upon the energization of the pilot motor the brake is released and the pilot motor is free to operate, but upon the deënergization of the pilot motor the brake solenoid is also deënergized and the brake is applied. This is to provide for stopping the main motor controller substantially simultaneously with the deënergization of the pilot motor to avoid the inaccuracies which would probably occur by permitting the main motor controller to coast. Electromagnetic switches 6 and 7 are provided for energizing the pilot motor with the field windings 3 and 4 in circuit, respectively. These switches are controlled by means of a switching arrangement 8 and 9. To control this switching arrangement 8, 9, I have provided a synchronous motor 10 and a master controller 11, and the arrangement is such that the switches 8 and 9 are operated to energize or deënergize the pilot motor 2 responsively to the relative movement of the synchronous motor 10 and the main motor controller 1 by means of the differential gear arrangements 12 and 13.

The differential 13 is connected to the differential 12 by means of slow motion gearing so that the differential 13 will move synchronously with the differential 12 but at a slower speed. The synchronous motor 10 is adapted to be controlled by means of the master controller 11 so that a movement of the master controller 11 will produce a corresponding synchronous movement of the synchronous motor, thereby operating the differentials 12 and 13 so as to move the switches 8 and 9 to energize the pilot motor 2 and cause it to move the main controller 1 through the worm and gear arrangement 14 until this controller has been moved to the position corresponding to the final position of the master controller 11. When the main controller has been thus moved, the switches 8 and 9 are operated to deënergize the pilot motor and apply the solenoid brake 5 through the medium of the differential gear arrangement. The motor generator set 15, the motor of which is energized from the conductor 16, is provided for furnishing a low voltage source of supply for the pilot motor 2, the synchronous motor 10, and the control apparatus in general, as distinguished from the main driving motor circuits.

The synchronous motor 10 and the master controller 11 are preferably of that form fully described in the patent to John L. Hall, No. 706,554, granted August 12, 1902. Briefly stated, the commutating device consists of a cylinder having three contact segments 17, 18 and 19 and two insulated movable brushes 20 and 21, connected across the source of supply from the generator of the motor generator set 15. By this arrangement a direct current supply furnished by the generator of the motor generator set 15 has the effect of current having three phase relation, which current is conducted through the conductors 22, 23 and 24 to the stator of the synchronous motor 10. The rotor 25 of this motor is separately excited by direct current supplied through the conductor 26 and is arranged to drive the shaft 27 having connections with one end of the differentials 12 and 13, the arrangement being such that turning the handle 28 of the commutating master controller will rotate the cylinder of the commutating device a certain amount, causing the rotor 25 of the motor 10 to be rotated correspondingly, which in turn correspondingly rotates the switches 8 and 9 through the medium of the differential gears.

The switch 8 is provided for small movements of the commutating master controller and the switch 9 is provided for larger movements, such as when the master controller is turned from the "off" position to the full on position, or vice versa. If the switch 9 were not provided, the switch 8 would be compelled to make and break the circuit of the pilot motor a number of times before the final position corresponding to the final position of the master controller had been reached. The switch 9 is operated through the medium of the differential 13 by means of the slow motion gear 29 which is driven by means of the pinion 30 on the shaft 27 of the synchronous motor 10.

To provide against accelerating the driving motors faster than the safe current capacity of the motors will permit, the current limit throttle 31 is provided for opening the source of supply for the pilot motor and thus stop the main controller when the current of the driving motors has exceeded a predetermined amount. The no-voltage relay 32, which is normally in its up or attracted position when the train unit is in operation, is adapted to close its contacts in response to a failure of voltage in the trolley circuit and energize the pilot motor 2 from the battery 33, or other convenient source of supply, to return the main motor controller to the "off" position and thus open the circuit to the driving motors. The train wires 22, 23, 24 and 34 are provided for connecting the control on the various train units together so that these various train units, all equipped with a control similar to that shown in Fig. 1, can be controlled from a single point. Thus, referring to Fig. 2, the master controller 11 is connected through the train wires and the coupler 35 so that a movement of the master controller will cause a corresponding movement of the synchronous motors on all the train units and energize the pilot motors 2 and 2' to operate the main controllers 1 and 1' to make the various changes in the driving motor circuits on all the train units simultaneously.

As thus constructed and arranged, the operation of my invention is as follows:—

Assuming that the conducting shoe T is in contact with the trolley so that the train unit may receive energy, the no-voltage relay 32 will be energized to raise its contacts. The motor generator set 15 will be energized to supply a low voltage current to the control circuits, the motor of this set receiving energy from the supply conductor 16. Before starting the train unit, the manually operated switches 36 and 37 will be first closed so that the pilot motor 2 and the synchronous motor 10 may be energized in response to movements of the master controller 11. Assuming that the parts are in the relative positions shown in Fig. 1, by turning the handle 28 of the master controller to the first operative position, the synchronous motor 10 will be energized to rotate its shaft 27 a corresponding amount, and thus through the differential 12 move the switch arrangement 8 a corresponding amount, since this switch 8 is operated by means of the shaft 38 having the pinion 39 in mesh with the beveled gear 40, and the end of the differential connected to the main controller is stationary. The switching arrangement 8 will thereby be moved so that the contact 41 will be in engagement with the segment 42, thus energizing the coil of the electromagnetic switch 6 from the motor generator set 15 through a circuit including the conductor 34, conductor 43, conductor 44, conductor 45, segments 46 and 47 of switching arrangement 9, segments 48 and 42 of switching arrangement 8. The switch 6 is thereby energized to close and energize the pilot motor 2 through a circuit including the conductor 44, contact members of electromagnet switch 6, and field winding 3. The pilot motor will operate the main controller 1 through the worm drive 14 in a forward direction, causing the cams 49 and 50 to close the switches 51 and 52, respectively, thereby connecting the driving motors in series with the starting resistances $R^1$, $R^2$, $R^3$, $R^4$ across the source of supply from the trolley. As soon as the main controller has been moved to the first operative position, the switching arrangement 8 is sufficiently operated in a reverse direction to deënergize the coil of the electromagnet switch 6 by means of the gear 53 connected to the main controller and the pinion 54 on one end of the differential 12. It will thus be seen that by turning the master controller to a definite position, the switching arrangement 8 is caused to practically simultaneously assume a corresponding position so as to energize the pilot motor to move the main controller at a rate of speed independent of the rate at which the master controller was moved, and when the main controller has moved to the position corresponding to the final position of the master controller, the pilot motor is automatically deënergized through the medium of the differential gear arrangement.

If it is desired to accelerate the driving motors to full speed; that is, the position of the main controller where driving motors are in parallel with all the starting resistances $R^1$ to $R^4$ cut out of circuit, this can be done by simply moving the master controller 11 to the final position, whereupon the switching arrangements 8 and 9 are operated in response to the corresponding movement of the synchronous motor 10 and the pilot motor is thereby energized to move the main controller until it has reached a position corresponding to the final position of the master controller.

In order to avoid having the circuit of the pilot motor energized and deënergized a number of times in advancing the main controller to the full parallel position, or any other relatively large movement of the master controller, the switching arrangement 9 has been provided. This switching arrangement is operated through the shaft 55 having a pinion 56 in mesh with the beveled gear 57 of the differential 13. Because of the fact that the gear ratio between the pinion 30 and the gear 29 is such that, for instance, the shaft 55 will move through only $\frac{1}{8}$ of the movement of the shaft 38 for the switch 8, the circuit for the electromagnet 6 is made through the segments 46 and 58 of the switch 9 and the circuit through the switch 8 is broken by reason of the segment 47 of the switch 9 having been moved from engagement with its corresponding contact. It is considered unnecessary to trace out fully the changes which are made by the operation of the main controller 1 in advancing from the initial to its final position, because this will readily be understood by those skilled in the art, and particularly since my invention is in no manner limited to any particular switching arrangement in the driving motor circuits for effecting the acceleration of the motors. Briefly stated, however, it can be said that the driving motors are first connected in series with all of the starting resistances $R^1$ to $R^4$ included in the circuit, then the resistances $R^1$, $R^3$, $R^2$, $R^4$ are successively cut out, leaving the driving motors in the full series position. Next, the series connection is broken and the motor $M^1$ is connected across the source of supply, with the resistances $R^1$, $R^2$ reinserted, then the motor $M^2$ is likewise connected across the source of supply with the resistances $R^3$, $R^4$ reinserted. These starting resistances are then cut out of their respective motor circuits until the motors are brought up to full speed in the parallel relation.

It will readily be understood that the main motor controller can be brought up to any operative position desired by simply moving the master controller 11 to that position, thereby energizing the pilot motor through the medium of the synchronous motor and the differential gear arrangements and causing the main controller 1 to be moved until the pilot motor is deënergized through the medium of the differentials.

In order to return the main controller 1, say, for instance, from the full parallel position to the full series position, this can be done by moving the master switch 11 to the full series position, thereby causing the synchronous motor 10 to move the switching arrangements 8 and 9 through the medium of the differentials 12 and 13 so that the electromagnetic switch 7 is energized. In this case the contact segment 59 of the switch 9 and the contact segment 60 of the switch 8 will be used instead of the contact segments 58 and 42, respectively, as was the case when the main controller was advanced. Energizing the electromagnetic switch 7 causes the pilot motor to be energized with the field winding 4 in circuit instead of the field winding 3, and the pilot motor is thus reversed, causing the main controller 1 to be likewise moved in the reverse direction until the full series position has been reached. From the above it can be seen that the driving motors can be started and stopped and generally controlled as desired. The number of control steps that can be had and the number of driving motors that can be controlled can be varied at will by making the necessary changes in the cams on the main controller and the switches controlled by these cams.

If for any reason the source of supply for the train unit fails, the no-voltage relay 32 will drop its contacts and energize the pilot motor from the battery 33 through a circuit including segments 61, 62 of the main controller and the field winding 4 so as to move the main controller to the "off" position, whereupon the pilot motor is deënergized by reason of the contact segments 61 and 62 opening the circuit at their respective contacts. In case the current taken by the motors when being accelerated exceeds a predetermined safe limit, the throttle 31 will pick up its contacts and thus arrest any further movement of the main controller 1 until the motors have been accelerated and the motor current has dropped so that the throttle 31 can close its contacts.

By means of the train wires 22, 23, 24 and 34 and couplers, such as 35, between the various train units, all of the train units can be controlled from a single master controller, as will be readily understood.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. In a motor control, the combination with a main motor controller and a pilot motor for operating the same, of a synchronous motor and switch mechanism controlled thereby for controlling the energization of the pilot motor, a master controller, and connections whereby a movement of the master controller produces a synchronous movement of the synchronous motor and operates the switch mechanism to energize the pilot motor until the main controller has been moved to a position corresponding to the final position of the master controller.

2. In a motor control, the combination with a main motor controller and a pilot motor for operating the same, of switch mechanism for controlling the energization of the pilot motor, a master controller, and means operated responsively to the relative movement of the master controller and the main controller for energizing the pilot motor to move the main controller until the main controller has reached a position corresponding to the final position of the master controller and then automatically deënergizing the pilot motor.

3. In a motor control, the combination with a main motor controller and a pilot motor for operating the same, of switch mechanism for controlling the energization of the pilot motor, a master controller, and a differential gear mechanism for operating the switch mechanism responsively to the relative movement of the master controller and the main controller to energize the pilot motor to move the main controller at a rate independent of the rate of movement of the master controller until the main controller has reached a position corresponding to the final position of the master controller.

4. In a motor control, the combination with a main motor controller and a pilot motor for operating the same, of switch mechanism for controlling the energization of the pilot motor, a synchronous motor and a master controller for controlling the same, differential gear mechanism connected to the synchronous motor, the main controller, and the switch mechanism, for controlling the switch mechanism responsively to the relative movement of the synchronous motor and the main controller, and connections whereby moving the master controller produces a synchronous movement of the synchronous motor and through the resulting movement of the switch mechanism, the pilot motor is energized to move the main controller until a position corresponding to the final position of the master controller is reached.

5. A control for the driving motors of a plurality of train units, comprising a master controller on one of the train units; and a main motor controller, a pilot motor for operating the main motor controller, and a synchronous motor for controlling the pilot motor, on each of the train units; and means including train wires connecting the synchronous motors of all of the train units whereby a movement of the master controller energizes the pilot motors of all of the train units to move their respective main controllers at a rate independent of the rate of movement of the master controller until the main controllers have reached positions corresponding to the final position of the master controller.

6. A control for the driving motors of a plurality of train units, comprising a master controller on one of the train units; and a main motor controller, a pilot motor for operating the same, switch mechanism for controlling the energization of the pilot motor, a differential gear mechanism for operating the switch mechanism responsively to the relative movement of the master controller and the main controller to energize the pilot motor to move the main controller until the main controller has reached a position corresponding to the final position of the master controller, on each of the train units; and means connecting the differential gear mechanisms on all of the train units with the master controller for controlling all of said units simultaneously from a single point.

7. A control for the driving motors of a plurality of train units, comprising a master controller on one of the train units; and a main motor controller, a pilot motor for operating the same, switch mechanism for controlling the energization of the pilot motor, a synchronous motor, differential gear mechanism connected with the synchronous motor, the main controller, and the switch mechanism for operating the switch mechanism responsively to the relative movement of the synchronous motor and the main controller, on each of the train units; and connections whereby moving the master controller produces a synchronous movement of the synchronous motors on all the train units and energizes the pilot motors to move their respective main controllers until they have reached positions corresponding to the final position of the master controller.

In witness whereof, I have hereunto set my hand this 26th day of June, 1917.

WILLIAM S. H. HAMILTON.